(12) United States Patent
McLean et al.

(10) Patent No.: US 8,049,363 B2
(45) Date of Patent: Nov. 1, 2011

(54) MOTOR DRIVE CIRCUIT

(75) Inventors: Andrew McLean, Warley (GB); John Anthony Bolton, Tamworth (GB)

(73) Assignee: TRW Limited, West Midlands (GB)

( * ) Notice: Subject to any disclaimer, the term of this patent is extended or adjusted under 35 U.S.C. 154(b) by 354 days.

(21) Appl. No.: 11/990,245

(22) PCT Filed: Aug. 15, 2006

(86) PCT No.: PCT/GB2006/003032
§ 371 (c)(1),
(2), (4) Date: Mar. 23, 2009

(87) PCT Pub. No.: WO2007/020419
PCT Pub. Date: Feb. 22, 2007

(65) Prior Publication Data
US 2009/0218967 A1   Sep. 3, 2009

(30) Foreign Application Priority Data

Aug. 16, 2005 (GB) .................................. 0516738.2

(51) Int. Cl.
*H02J 3/32* (2006.01)
(52) U.S. Cl. .................. 307/48; 318/400.3; 318/400.14; 318/492; 318/139; 323/239; 323/286; 323/289; 323/282; 320/166; 320/127; 361/212; 361/11; 307/45; 307/46; 307/401
(58) Field of Classification Search ............. 318/400.14, 318/379, 492, 139; 307/45, 46, 401; 361/212, 361/11; 320/166, 127; 323/239, 286, 289, 323/282
See application file for complete search history.

(56) References Cited

U.S. PATENT DOCUMENTS

| | | | |
|---|---|---|---|
| 3,585,491 A | 6/1971 | Petersen | |
| 3,634,728 A | 1/1972 | Moury | |
| 4,139,885 A | 2/1979 | Overzet et al. | |
| 4,554,501 A * | 11/1985 | Baker | 322/29 |
| 4,745,513 A | 5/1988 | McMurray | |
| 4,953,054 A | 8/1990 | Fetzer et al. | |
| 4,998,054 A * | 3/1991 | Bose et al. | 318/802 |
| 5,170,105 A * | 12/1992 | Kumar | 318/362 |
| 5,172,309 A * | 12/1992 | DeDoncker et al. | 363/132 |
| 5,373,195 A * | 12/1994 | De Doncker et al. | 307/45 |

(Continued)

FOREIGN PATENT DOCUMENTS

EP    0 087 697 A1    7/1983

(Continued)

*Primary Examiner* — Rita Leykin
(74) *Attorney, Agent, or Firm* — MacMillan, Sobanski & Todd, LLC

(57) ABSTRACT

A motor drive circuit comprises positive and negative input terminals for connection of the motor circuit to a DC supply, a DC link filter connected between the input terminals: an electric motor having at least two phases, a plurality of motor drive sub-circuits, each connected to a respective phase of the electric motor and which each control the flow of current into or out of the respective phase of the motor that has been drawn from the supply through the DC link filter, and a switching means provided in the electrical path between the DC link filter and the electric motor drive sub-circuits, the switching means being movable between a closed position in which it connects the DC link filter to the motor drive sub-circuits, and an open position which isolates the DC link filter from the motor drive sub-circuits.

9 Claims, 2 Drawing Sheets

U.S. PATENT DOCUMENTS

| | | | | |
|---|---|---|---|---|
| 5,418,704 A | * | 5/1995 | Hua et al. | 323/282 |
| 5,485,060 A | * | 1/1996 | Canova | 315/209 R |
| 5,486,994 A | * | 1/1996 | Pouliquen et al. | 363/98 |
| 5,559,685 A | * | 9/1996 | Lauw et al. | 363/37 |
| 5,710,699 A | * | 1/1998 | King et al. | 363/132 |
| 5,737,205 A | * | 4/1998 | Pouliquen et al. | 363/96 |
| 5,864,477 A | * | 1/1999 | Webster | 363/132 |
| 7,489,048 B2 | * | 2/2009 | King et al. | 307/10.1 |

FOREIGN PATENT DOCUMENTS

| | | |
|---|---|---|
| EP | 1559632 A2 | 8/2005 |
| GB | 1151457 | 5/1969 |
| JP | 2004357412 A * | 12/2004 |

* cited by examiner

MOTOR DRIVE CIRCUIT

CROSS-REFERENCE TO RELATED APPLICATIONS

This application is the National Phase of International Application PCT/BB2006/00302 filed Aug. 15, 2006 which designated the U.S. and that International Application was published in English under PCT Article 21 (2) on Feb. 22, 2007 as International Publication Number WO 2007/020419 A1. PCT/BB2006/00302 claims priority to UK Patent Application No. 0516738.2, filed Aug. 16, 2005. Thus, the subject nonprovisional application claims priority to UK Patent Application No. 0516738.2, filed Aug. 16, 2005. The disclosures of both applications are incorporated herein by reference.

BACKGROUND OF THE INVENTION

This invention relates to a motor drive circuit which is especially, but not exclusively, suited to use in an electrical power-assisted steering (EPAS) system for a vehicle.

EPAS systems are known of the kind comprising an electric motor connected through a gearbox to act on a steering mechanism of the vehicle. For example, the gearbox may provide a connection between the motor and a steering column shaft, or directly onto a portion of a rack and pinion mechanism forming part of the steering mechanism.

The electric motor is used to assist a driver in applying torque to the steering mechanism, by applying an assistance torque of the same sense, to make it easier to turn the steering wheel, for example during parking manoeuvres. Thus, operation of the motor may assist in rotating the steering column shaft, or moving a portion of the steering rack mechanism. Of course, the motor may be connected to any part of any typical steering mechanism as long as it can provide an assistance torque to aid the driver in turning the steering wheel.

The motor, which may be a multi-phase brushless star-connected permanent magnet motor, is controlled by motor control means comprising control and drive circuits, which is operative to supply a current from a power supply to the motor phase windings. The phase windings of the motor are connected at a star point. Each phase is connected to a common supply rail which connects in turn to a positive terminal of the power supply by a top transistor, and to a negative supply rail which connects to a negative terminal by a bottom transistor, the two transistors defining an arm of a multiple arm bridge. This bridge forms the drive circuits, while the control circuits are provided by a microprocessor or digital signal processor or analogue signal processing or some combination thereof. The microprocessor is operative in response to signals from a torque sensor provided on the steering column to measure the torque applied by the driver, from a motor rotor position sensor providing information about motor speed and direction and optionally from signals corresponding to current flowing in the motor bridge or power supply. This information can be used in combination with the torque sensor signal and/or column position sensor signal to determine which phase winding should be energised and when. The microprocessor produces control signals which are used by a bridge driver to energise the transistors of the drive circuits to cause current to flow in a desired motor phase.

To prevent noise from the motor being passed to the DC supply terminals, a DC link filter is provided between the terminals and the motor phases. The purpose of this filter is to smooth out or filter out any high frequency noise that may be produced. It typically comprises a capacitor connected between the supply rails, and may also include one or more inductors connected in series in each rail between the terminals and the motor phases.

A problem with this electrical power-assisted steering system is that a fault occurring in the motor drive or control circuits can cause an error condition which is unacceptable in a vehicle steering system, where safety is critical.

For example, suppose that a top transistor in one arm of the bridge is energised in error while a bottom transistor in another arm of the bridge is also energised in error. This fault would result in a phase of the motor becoming permanently energised and cause the motor to become permanently attracted to a particular position, tending to clamp the steering column in position and resist rotation. This would be readily apparent to the driver, and is clearly undesirable. This situation could occur if the bridge driver is at fault, or if a short circuit occurs across the drive stage transistors, or if a short circuit occurs across the DC link supply.

One known solution to this problem is to provide a clutch between the motor and the steering column. The clutch, typically a dog or friction clutch, is normally engaged but in the event of a fault being detected, the clutch is operated to disengage the motor from the steering column. However, the clutch is costly and bulky, and additional test procedures must also be incorporated to check that the clutch can still be disengaged should it be necessary to do so, which again adds to the cost and is time-consuming.

Another solution is to provide a means for isolating the motor drive stage from the motor in the event of a failure, for example by providing a relay between the drive stage transistors and the phase connections to the motor. Yet a further solution is to use a relay to isolate the motor phases from the star point of the motor. Both of these solutions remove the drive current from the motor but are not without their problems and inherent disadvantages. Over time the contact resistance of a relay may deteriorate, perhaps reducing their operational speed, and they are also costly as well as bulky items to add to a motor.

Without any means to isolate the motor from the drive stage the phase windings are still connected together and also still connected to the drive stage. As a result of this an electrically conducting path could still be present around the bridge (i.e. through two short circuited transistors and two phase windings). Then, on rotation of the motor shaft drive due to rotation of the steering column, a back EMF is produced in one or more of the windings. As a result of this EMF and the complete electrical path around the bridge, a substantial current can flow through the motor phase windings which produces a torque in the opposite sense to the rotation of the motor shaft. This resisting torque is highly undesirable because in this case, not only is steering assistance lost due to disconnection of the power supply, but a resisting torque is then applied which makes turning the steering column difficult.

Another problem encountered in such a system is a short circuit to earth across the DC link filter. This is especially problematic where the capacitor is an electro-lytic component as a short can cause a catastrophic failure to occur.

Any device placed in the motor current path needs to be capable of carrying the motor current, breaking the high current inductive loads that may be present, and maintaining a low contact resistance.

These problems are, of course, not unique to applications in electric power steering systems.

BRIEF SUMMARY OF THE INVENTION

In accordance with the present invention, we provide a motor circuit comprising:

positive and negative input terminals for connection of the motor circuit to a DC supply, a DC link filter connected between the input terminals;

an electric motor having at least two phases, a plurality of motor drive sub-circuits, each connected to a respective phase of the electric motor and which each control the flow of current into or out of the respective phase of the motor that has been drawn from the supply through the DC link filter, and a switching means provided in the electrical path between the DC link filter and the electric motor drive sub-circuits, the switching means being movable between a closed position in which it connects the DC link filter to the motor drive sub-circuits, and an open position which isolates the DC link filter from the motor drive sub-circuits.

This motor circuit ensures that any short circuits of the motor phases to ground or one of the supply voltages will not cause a short across the DC link filter, and so prevent a catastrophic failure of the DC link filter. In addition, it removes one of the possible short circuit paths that may cause the motor to enter a braking mode of operation, which could present a safety hazard.

The motor may comprise a high reliability motor. By this we mean that the motor, including its phases windings and any associated connections, has a very low probability of failure in a mode which may cause motor braking.

Thus, the switching means together with the high reliability motor ensures, if a fault condition arises, that the motor does not provide a resisting torque to the movement of the steering column the switch means will isolate the motor from the DC supply so that no current flows in the phase winding. This means that no clutch is required.

The switching means may include means for operating the switch within a predetermined period of time from detecting a fault. A separate fault detection means may be provided which sends signals to the switching means when a fault is detected. The predetermined period may correspond to instantaneous operation, or within a time set by regulations. For example, the switching means may operate within 200 m seconds or perhaps less. Such fault detection means are well known in the art of fault protection.

Preferably, the switching means comprises a switch or relay which is connected in series between an output of the DC link filter and the inputs to the motor drive sub-circuits. Alternatively, the switching means may comprise a semiconductor device, such as a transistor.

One of the input terminals may be grounded, with the DC link filter connecting the other terminal to this ground. In that case, the switch means may be located in the electrical path between the side of the DC link filter connected to the non-grounded terminal and the motor drive sub-circuits.

An additional switching means may be provided between at least one of the DC supply terminals and the DC link filter. In an application in which one of the input terminals is connected to ground, the switch may be between the other terminal and the input to the DC filter. In an automotive application, this is typically the negative terminal.

When this switch is opened along with the other switch means the DC link filter will be completely isolated from both sources of power, i.e. the DC supply and the motor. This also prevents the possibility of reverse polarisation of the capacitors in the DC link during reverse battery conditions.

The invention is applicable to a wide range of motor types and sizes. In a preferred embodiment, the electric motor comprises a 3-phase motor which has its phases connected in a star formation. It may alternatively be connected in a Wye (or delta) formation.

The motor drive sub-circuits may each comprise a switch which can be opened and closed to electrically connect the motor phase to one of the input terminals through the DC link filter. Each phase of the motor may be connected to two such sub-circuits, each one connected to a different one of the input terminals. The motor drive sub-circuits may be arranged in such a manner that they cannot fail in such a way that they short each other out, i.e. by providing an independent circuit for each phase.

The motor may form part of an electric power assisted steering system in which its function is to apply an assistance torque to a steering column or other steering component to assist a driver of a vehicle in turning the wheel.

Other advantages of this invention will become apparent to those skilled in the art from the following detailed description of the preferred embodiment, when read in light of the accompanying drawings.

DETAILED DESCRIPTION OF THE INVENTION

Figure 1:
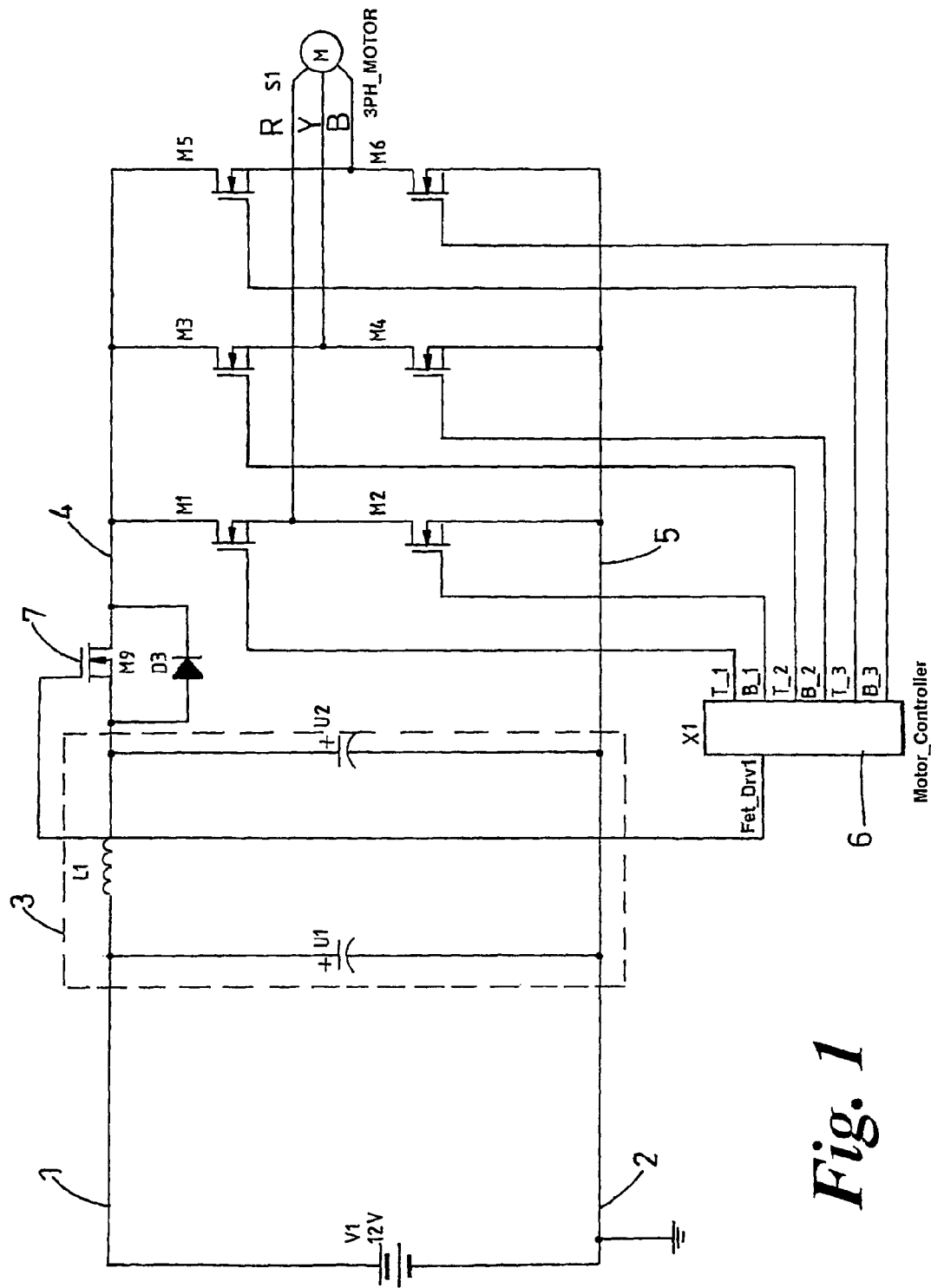
FIG. 1 is a detailed schematic of an electric motor and a drive circuit in accordance with a first embodiment of the present invention.

FIG. 1 illustrates a part of an electrical power-assisted steering (EPAS) system for use in a vehicle which incorporates an electric motor. The drive circuit comprises a pair of input terminals 1,2 for connection to the positive and negative supply rails of the vehicle. A DC link filter 3 is connected between the two terminals 1,2. It comprises two capacitors U1 and U2 connected in parallel between the two input terminals, with an inductor connected in series with one of the capacitors U2. An output of the DC link filter 3, taken from between the inductor L1 and capacitor U2 is fed to a rail 4 which carries current to several motor drive sub-circuits. The sub-circuits are connected as a three phase bridge, with each phase of the bridge comprising a motor drive sub-circuit having a transistor M1-M6 connected to one of the rail 4 or to ground 5. A top transistor M1 is connected between the first end of a respective phase winding (R, Y, B) and the positive supply rail 4, and a bottom transistor M2 is connected between the first end of the respective phase winding and the negative supply rail 5. Each of the transistors is shown as a single power transistor, which may be of the FET or bi-polar type. The transistors are energised or de-energised by an electronic drive circuit 6.

In the electrical circuit between the DC link filter and the rail 4 supplying the motor drive sub-circuits is a switch means 7. This comprises a semiconductor switch in the form of a transistor M9 with an intrinsic diode D3 connected across its source and drain terminals. During normal operation the power dissipation of the device can be reduced by enhancing the device channel to avoid the voltage drop that would otherwise result from the current passing through the intrinsic diode D3.

In the event that a DC link short circuit fault is detected which would lead to incorrect operation of the electric motor, the switch means 7 is opened so that rail 4 is not shorted to rail 5. The bridge rectification of the transistors M1-M6 and the intrinsic diode D3 ensures that the motor current cannot flow from rail 4 to rail 5.

Figure 2:
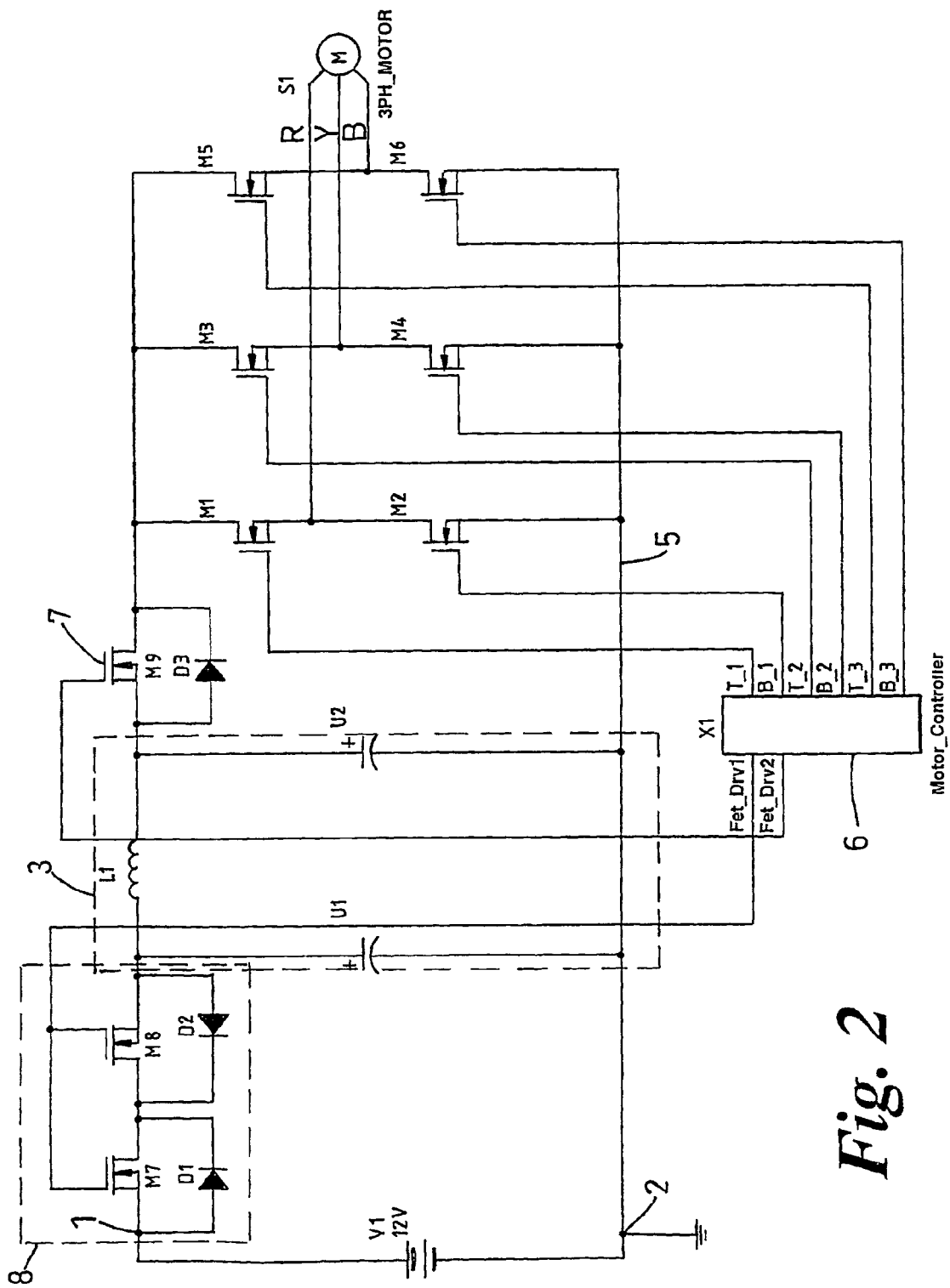
FIG. 2 shows a motor and an alternative embodiment of a drive circuit to which the present invention is applicable.

An alternative arrangement is shown in FIG. 2 of the accompanying drawings. This is identical to that shown in FIG. 1 apart from the addition of a further semi-conductor switch means 8 in the electrical path from the input terminal to the DC link. Switch 8 comprises two transistors M7 and M8 and respective intrinsic diodes D1 and D2. Switch 8 works in tandem with switch 7 such that they both open and close at the same time. They are normally both closed but in the event of a failure they are both opened to give complete isolation of the DC link filter.

In accordance with the provisions of the patent statutes, the principle and mode of operation of this invention have been explained and illustrated in its preferred embodiments. However, it must he understood that this invention may he practiced otherwise than as specifically explained and illustrated without departing from its spirit or scope.

What is claimed is:

1. A motor circuit comprising:
    a positive input terminal and a negative input terminal each for connection of the motor circuit to a DC supply;
    a DC link filter connected between said positive input terminal and said negative input terminal;
    an electric motor having at least two phases:
    a plurality of motor drive sub-circuits, each connected to a respective phase of said electric motor through an electrical path and which each motor drive sub-circuit controls a flow of current into or out of said respective phase of said motor that has been drawn from said DC supply through said DC link filter; and
    a switch provided in said electrical path between said DC link filter and said electric motor drive sub-circuits, said switch being movable between a closed position in which it connects said DC link filter to said motor drive sub-circuits, and an open position in which it isolates said DC link filter from said motor drive sub-circuits.

2. A motor circuit according to claim 1 wherein said motor comprises a high reliability motor.

3. A motor circuit according to claim 1 wherein said switch comprises a relay which is connected in series between an output of said DC link filter and inputs to said motor drive sub-circuits.

4. A motor circuit according to claim 1 wherein said switch comprises a semi-conductor device, such as a transistor.

5. A motor circuit according to claim 1 wherein one of said input positive terminals and negative input terminals is grounded, with said DC link filter connecting another of said terminals to said ground, and further wherein said switch is located in an electrical path between a side of said DC link filter connected to said other terminal and said motor drive sub-circuits.

6. A motor circuit according to claim 5 wherein an additional switch is provided between at least one of said positive DC input terminal and said negative input terminal and said DC link filter.

7. A motor circuit according to claim 6 wherein said additional switch is provided between said other terminal and an input to said DC filter.

8. A motor circuit according to claim 7 wherein said additional switch and said switch are opened and closed at the same time.

9. An electric power assisted steering system which includes a motor circuit according to claim 1.

* * * * *